(12) United States Patent
Barsness et al.

(10) Patent No.: US 10,346,407 B2
(45) Date of Patent: *Jul. 9, 2019

(54) PERFORMANCE MONITORING OF WAIT TIMES

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/844,722

(22) Filed: Dec. 18, 2017

(65) Prior Publication Data

US 2018/0107717 A1 Apr. 19, 2018

Related U.S. Application Data

(63) Continuation of application No. 14/735,711, filed on Jun. 10, 2015, now Pat. No. 9,875,281.

(51) Int. Cl.
*G06F 15/173* (2006.01)
*G06F 16/2455* (2019.01)
*H04L 29/06* (2006.01)
*G06F 16/901* (2019.01)
*G06F 16/2457* (2019.01)

(52) U.S. Cl.
CPC .. *G06F 16/24568* (2019.01); *G06F 16/24573* (2019.01); *G06F 16/9024* (2019.01); *H04L 65/601* (2013.01)

(58) Field of Classification Search
USPC ................. 709/224, 201, 205, 217
See application file for complete search history.

(56) References Cited

U.S. PATENT DOCUMENTS 8,060,614 B2 11/2011 Goldstein et al.
8,112,425 B2 2/2012 Baum et al.
(Continued)

OTHER PUBLICATIONS

Arasu et al., "STREAM: The Stanford Data Stream Management System," Technical Report, Stanford InfoLab, Department of Computer Science, Stanford University, 2004, pp. 1-21. http://ilpubs.stanford.edu/641/1/2004-20.pdf.
(Continued)

*Primary Examiner* — Lan Dai T Truong
(74) *Attorney, Agent, or Firm* — James L. Olsen

(57) ABSTRACT

Embodiments of the present disclosure include a method, a system, and a computer program product for determining wait times of tuples within a streaming environment. The method includes monitoring one or more tuples being processed within an operator graph where the operator graph includes a first processing element and a queue of the first processing element. The method includes recording a wait time of the one or more tuples within the queue of the first processing element. The method includes recording a processing time of the one or more tuples within the first processing element. The method includes displaying the wait time and the processing time of the one or more tuples. The method includes optimizing a configuration of the operator graph, in response to recording the processing time of the one or more tuples.

8 Claims, 9 Drawing Sheets

(56) References Cited

U.S. PATENT DOCUMENTS

| | | | |
|---|---|---|---|
| 8,782,650 | B2 | 7/2014 | Takahashi et al. |
| 2009/0313614 | A1 | 12/2009 | Andrade et al. |
| 2014/0047342 | A1 | 2/2014 | Breternitz et al. |
| 2014/0064413 | A1 | 3/2014 | Huebner et al. |
| 2014/0156707 | A1 | 6/2014 | Sax et al. |
| 2014/0236920 | A1 | 8/2014 | Branson et al. |
| 2014/0237134 | A1 | 8/2014 | Branson et al. |
| 2015/0295931 | A1 | 10/2015 | Russell et al. |

OTHER PUBLICATIONS

Chandramouli et al., "Accurate Latency Estimation in a Distributed Event Processing System," IEEE 27th International Conference on Data Engineering (ICDE '11), Apr. 2011, pp. 1-12, IEEE.

Jiang et al., "Queueing Analysis of Relational Operators for Continuous Data Streams," CIKM '03: Proceedings of the 12th International Conference on Information and Knowledge Management, Nov. 2003, pp. 1-9, ACM.

Barsness et al., "Performance Monitoring of Wait Times," U.S. Appl. No. 14/735,711, filed Jun. 10, 2015.

Barsness et al., "Performance Monitoring of Wait Times," U.S. Appl. No. 14/869,736, filed Sep. 29, 2015.

List of IBM Patents or Patent Applications Treated as Related, Signed Dec. 18, 2017, 2 pages.

PERFORMANCE MONITORING OF WAIT TIMES

BACKGROUND

This disclosure generally relates to stream computing, and in particular, to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for monitoring wait times of tuples within a streaming environment. The method, system, and computer program product receive two or more tuples to be processed by a plurality of processing elements that are operating on one or more computer processors.

One embodiment is directed toward a method for determining wait states of tuples within a streaming environment. The method includes monitoring one or more tuples being processed within an operator graph where the operator graph includes a first processing element and a queue of the first processing element. The method includes recording a wait time of the one or more tuples within the queue of the first processing element. The method includes recording a processing time of the one or more tuples within the first processing element. The method includes displaying the wait time and the processing time of the one or more tuples. The method includes optimizing a configuration of the operator graph, in response to recording the processing time of the one or more tuples.

Another embodiment is directed toward a system for determining wait states of tuples within a streaming environment. The system includes a memory, and a processor device communicatively coupled to the memory. The memory and processor device are also communicatively coupled to a stream manager that is configured to monitor one or more tuples being within the processing stage of a processing element within the streaming environment. The stream manager is configured to monitor one or more tuples being processed within an operator graph where the operator graph includes a first processing element and a queue of the first processing element. The stream manager is configured to record a wait time of the one or more tuples within the queue of the first processing element. The stream manager is configured to record a processing time of the one or more tuples within the first processing element. The stream manager is configured to display the wait time and the processing time of the one or more tuples. The stream manager is configured to optimize a configuration of the operator graph, in response to recording the processing time of the one or more tuples.

Yet another embodiment is directed toward a computer program product for determining wait states of tuples within a streaming environment. The computer program product is configured to monitor one or more tuples being processed within an operator graph where the operator graph includes a first processing element and a queue of the first processing element. The computer program product is configured to record a wait time of the one or more tuples within the queue of the first processing element. The computer program product is configured to record a processing time of the one or more tuples within the first processing element. The computer program product is configured to display the wait time and the processing time of the one or more tuples. The computer program product is configured to optimize a configuration of the operator graph, in response to recording the processing time of the one or more tuples.

Figure 1:
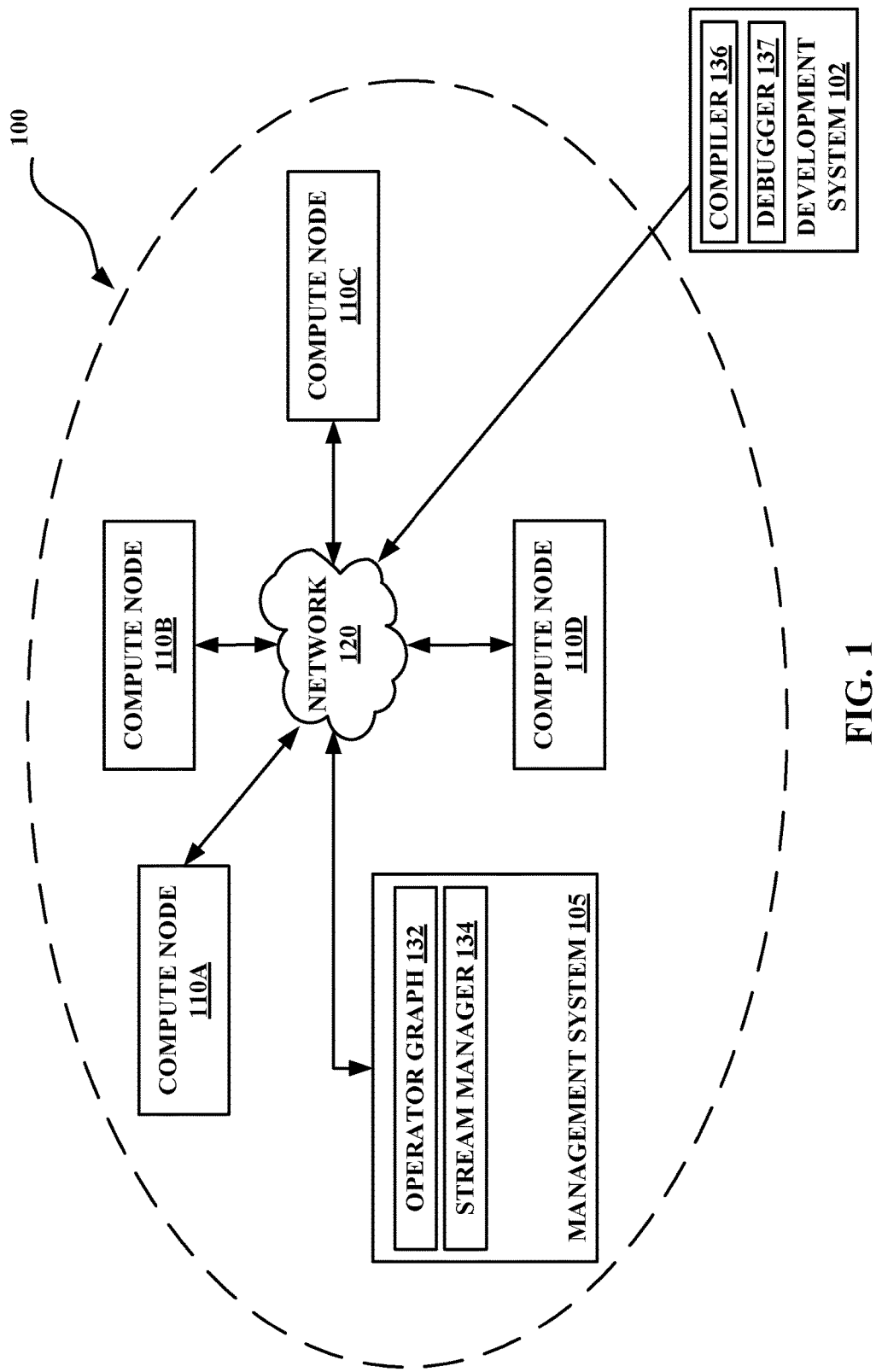
FIG. 1 illustrates a computing infrastructure configured to execute a stream computing application according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to stream computing, more particular aspects relate to determining wait times of tuples within a data stream. While the present disclosure is not necessarily limited to such applications, various aspects of the disclosure may be appreciated through a discussion of various examples using this context. The disclosure monitors the movement of tuples throughout the streams environment as the tuples wait to enter processing elements, and are processed by processing elements.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, the run environment of the present description and the claims, may include an output tuple that has the same data attributes or is associated with the same entity as a corresponding input tuple which will be referred to herein as the same tuple unless the context or an express statement indicates otherwise.

Performance issues in computing may involve an application waiting for something within the streaming environment. For example, the application may wait for processing elements to perform operations within the streaming environment. These performance issues may also cause applications to be unable to use all the processing power available. Underutilized processing power of a central processing unit (CPU) may increase difficulty in determining and solving performance issues compared to an overburdened CPU. Traditional operating systems often have performance tools that assist a user in understanding why an application is waiting. If the application is waiting, the wait time within the streaming environment may determine a wait condition. Conditions causing the application to wait may be known as wait conditions. The wait conditions may join to from wait buckets. Wait buckets may be monitored within the streaming environment to determine where and why the data or tuples are waiting. Wait buckets may include a collection of tuple data of the tuples waiting within the streams environment.

When tuples enter the streaming environment, they may enter one or more processing elements that perform various operations on the tuples. The amount of time the tuple spends within the streaming environment may be recorded as an execution time. The execution time may measure the point in time the tuple enters the streaming environment, to the point in time the tuple leaves the streaming environment. The points in time may be recorded as time stamps where a first time stamp is recorded when the tuple enters the streaming environment, and a second time stamp is recorded when the tuple leaves the streaming environment.

The tuples may also spend time within the processing elements of the streaming environment. The amount of time the tuple spends within the processing elements may be recorded as a processing time. The processing time may measure the point in time the tuple enters a processing element, to the point in time the tuple leaves the processing element. The points in time may be recorded as time stamps where a first time stamp may be recorded when the tuple enters the processing element, and a second time stamp is recorded when the tuple leaves the processing element.

The streaming environment may use "hooks" to provide wait state information to users and applications when requested. In a streaming environment, these hooks may be programmed and inserted into the streaming environment. The hooks may be inserted to capture additional wait state information when the current wait state information is insufficient to discern why an application waits. The wait state information may also be used to determine what causes bottlenecks within the streaming environment.

Tuples may have characteristics that are specific to the tuple within a streaming environment. Characteristics of the tuple may cause other tuples to wait at a queue of a processing element, described further herein. A tuple characteristic may include the attributes of the tuple. For example, the tuple characteristic may include the number of attributes or traits of attributes the tuple has. A trait of a tuple may include a value of an attribute. The characteristics may cause the tuple to have an increased processing time within a processing element as the processing element operates on the tuple. Tuple characteristics may also include queue wait times when the tuple has to wait before entering a processing element. Tuples may be monitored to determine where and why are stalled inside an operator graph and not consuming CPU resources. The information may be gathered by the hooks, which may gather the information by monitoring the tuples to provide an end user with wait state information of the stream. An example of the end user may include a stream administrator or network administrator monitoring the streaming environment.

The wait time of the tuples may be monitored and measured based on the configuration of the streaming environment. For example, the processing time of the tuples within the processing element may be measured in minutes, seconds, or milliseconds. When tuples increase in complexity or include difficult to process attributes, the wait time of the tuple may increase compared to less complex tuples.

Wait state information may be gathered as tuples move through the streaming environment. The wait state information may be displayed on a graphical user interface (GUI) that may be monitored by an end user. The wait state information may be gathered by bucketing the wait types and wait times with the associated tuples. Bucketing of the wait state information can include gathering the wait state information for each queue or processing element the tuple may wait within the streaming environment. The wait buckets may then be gathered to determine locations the tuple may have waited within the streaming environment. Trace type tools and statistical collection mode tools may be incorporated to better monitor the streaming environment.

The hooks may be utilized to gather wait state information within the streaming environment. The hooks may be used to keep track of tuples as they are passed from a first processing element to a second processing element as well as a wait time between the first processing element and the second processing element. To monitor the tuples, tuple identification numbers (tuple IDs) may be used to identify the tuples. The tuple IDs may be used to distinguish tuples from one another. For example, a first tuple may be assigned a tuple ID of T1, while a second tuple may be assigned a tuple ID of T2, thus distinguishing the first tuple from the second tuple. The tuple IDs may also be used to group the tuples by tuple types. The tuple types may group one or more tuples by their attributes. The one or more tuples may be grouped by the data or attributes the one or more tuples have in common. Tuples that were grouped by their attributes may be monitored to determine if given values for attributes cause additional waiting. By grouping the wait time of the tuple, the wait time may be linked to specific characteristics of the tuples.

In various embodiments, the bucketing of tuples may be used to determine if there are correlations between attributes and wait times of the tuples. Grouping may include determining attributes of the tuples and grouping one or more tuples with the same attribute. The attributes of the tuples may cause the tuple to have an increased wait time within the processing element. For example, if a first attribute may require a longer processing time than a second attribute. If tuples are grouped according to attributes the tuples share, the attributes can be monitored within multiple tuples of the streaming environment. For example, depending upon the attributes of the tuple processing elements may take a longer time to process a tuple with a first attribute when compared to a tuple with a second attribute. The processing time of the first tuple may be more than the second tuple casing a wait time of the tuple within the queue of the second tuple to be longer than a tuple waiting for the second tuple to be processed. The processing time, or wait time of the tuple may correlate between all tuples with the same attribute.

In various embodiments, the tuples with a same trait of an attribute may be grouped and assigned an average wait time when outputted to the end user. The average wait time may be determined by averaging the wait time of every tuple with the attribute being monitored within a specific processing element. The average may be calculated using the wait time of each of the tuples. If tuples with a processing time of the first attribute fall outside of a mean value when compared to the tuples within the same attribute, then the tuples with the first attribute may be averaged. The tuples that fall outside the mean value may be treated as tuples within a singular identity. The tuples may be treated as a singular identity to determine if a specific attribute causes the tuple to take more time to be processed. The wait times within each processing element may also be monitored to determine which processing element caused the tuples with the first attribute to consistently wait. For example, if the wait times of the tuple with the first attribute are not consistent within each processing element, then the wait times may be averaged. An example of sporadic wait time may include three tuples with the same trait for an attribute. The tuples may include a 3 second wait time for the first tuple, a 3 second wait time for the second tuple, and a 4 second wait time for the third tuple. These wait times may be averaged for a 3.33 second wait time for the group of tuples.

In various embodiments, each tuple may be treated as a singular tuple with a singular identity, instead of grouping the tuples by attribute. Tracking each tuple individually may allow for a trace mode monitoring of the tuples. The trace mode monitoring may include a more detailed monitoring of a tuple as compared to grouping the tuples by attribute.

In various embodiments, after monitoring wait state information of the processing elements, specific wait type conditions may be monitored within the streaming environment. Examples of specific wait type conditions may include wait time within a queue, wait time within specific processing elements, or specific tuple wait time tracking. Examples of specific processing elements could include barrier operators, join operators, sort operators, assignation operators, sort operators, filter operators, or custom operators. An example of specific tuple wait time tracking may include tracking a first tuple as the tuple moves from a first queue to a first processing element. The use and application of the specific tuple wait time tracking conditions are described further herein.

The wait time in a queue before being processed by a processing element may be used to determine the wait time of the tuples between processing elements. When the processing element performs operations upon the tuples, the tuple can be considered within the processing stage of the processing element. The tuples may be monitored to determine queue times or wait times of tuples not within a processing element. These tuples may be waiting to enter a processing element. The tuples waiting to enter a processing element may be monitored to determine a wait time for the queue. The queue time may be tracked by the stream manager for each of the tuples waiting to enter a processing element. The queue times may also be bucketed to determine the wait times of all of the tuples waiting to enter the processing element.

In various embodiments, the wait time of the queue may be measured by a time stamp generated from the tuples entering and leaving processing elements. The time stamp may include the time the tuple left a first processing element and entered a second processing element. The queue time could include the time the tuple spent between leaving the first processing element and entering the second processing element. For example, a first tuple may receive a first time stamp upon entering the streaming environment. A second time stamp may be assigned to the first tuple upon entering a first queue of a first processing element, and a third time stamp may be assigned to the first tuple when the first tuple leaves the first queue of the first processing element and enters the first processing element. After being processed by the first processing element, the tuple may receive a fourth time stamp upon leaving the first processing element. The time stamping may continue assigning subsequent time stamps to the tuple based on the location of the first tuple with the streaming environment. When the tuple reaches the final processing element or sink of the streaming environment, the tuple may receive a final or end time stamp indicating that the tuple has left the streaming environment. The time from when the tuple entered the streaming environment, first time stamp, to the point the tuple leaves the streaming environment, end time stamp, may be recorded as an execution time. The execution time may include the length of time the tuple spends within the streaming environment.

A barrier operator may include an operator that requires one or more tuple inputs to be processed. The barrier operator may be utilized to merge two or more input streaming environment that are logically similar. An example a barrier operator within the streaming environment may include waiting on four unique streaming environment of data exists. A tuple may arrive at a first processing element and has to wait for data or a tuple at a second processing element, a third processing element, and a fourth processing element. When the barrier operator receives data that tuples have reached all four processing elements, the tuples may leave the barrier operator, and the amount of time the tuple spends waiting for the barrier operator may be recorded as a wait condition. If one or more tuples are held by the barrier operator, then the barrier operator may output one tuple ID from the one or more tuples that were held by the barrier operator. For example, if four tuples were held in the first, second, third, and fourth processing elements, only one tuple ID may be outputted. The outputted tuple ID may include one of the four that were used by the barrier operator, or the tuple ID may be a newly generated tuple ID. If a newly generated tuple ID is used, the tuple IDs processed by the barrier operator may be linked to the newly generated tuple ID.

A join operator may be monitored for wait times within the streaming environment. The join operator may include two or more sending processing elements that send data or tuples to a single receiving processing element. A join operator may be monitored for the wait time when a join condition for a given tuple is reached. The join operator can receive two tuples from one or more processing elements and join them together. For example, when two processing elements are sending processing elements, tuples of each processing element may be matched. The tuples within the first processing element may be matched with the tuples within the second processing element and the matched tuples may be sent to a third processing element. The third processing element may receive the joined tuples as a single tuple. The tuple ID of a joined tuple may include the tuple ID of one of the two tuples that were joined, or the tuple ID of the received tuple may be a newly generated tuple ID. The amount of time the tuple spend waiting to enter the join operator may be recorded as a wait condition. The wait condition may be a processing time or a wait time where the tuple had to wait for something within the streams environment. The wait condition can be gathered by a hook to provide information to an end user.

A window operator may be monitored for wait times within the streaming environment. Window operators may be similar to both join and barrier operators, but may cause a tuple to not leave the window operator. Tuples within a window operator may be joined to other tuples within the same windowing operator. Tuples that occur infrequently may cause tuples paired with the infrequent tuples to wait a longer time than tuples with more frequent pairings. In various embodiments, a tuple may not leave a window operator if a pair matching the tuple does not enter the window operator. The amount of time the tuple spend waiting to leave the window operator may be recorded as a wait condition. The wait condition may be a processing time or a wait time where the tuple had to wait for something within the streams environment. The wait condition can be gathered by a hook to provide information to an end user.

To track the movement of tuples within and/or between processing element, tuple IDs may be assigned to all tuples entering the stream. Processing elements may include a different solution for hard to track tuples. To monitor the hard to track tuples, the tuple IDs may be monitored as the tuples are passed into and out of an operator. The hard to track tuples may also be monitored to determine if the tuples leave (or are removed from) a streaming environment without entering a sink. An example of a tuple being removed from a streaming environment could include a processing element that is a filter. The filter may be used to remove tuples from the stream. If a tuple is filtered out of the streaming environment, the tuple may enter a processing element, but not enter the following queue. Filters may be monitored separately for the wait time of the tuple within the filter. Filters may also be monitored for the tuple attributes that the filter is designed to remove from the stream. After the tuple leaves the streaming environment, the time the tuple spends within the streaming environment can be recorded as an execution time.

The resulting wait times may be displayed on an input/output (I/O) device or a GUI. The GUI may be accessible by an end user to determine the wait state information of the streaming environment. The determination of the wait state information will be described further herein.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
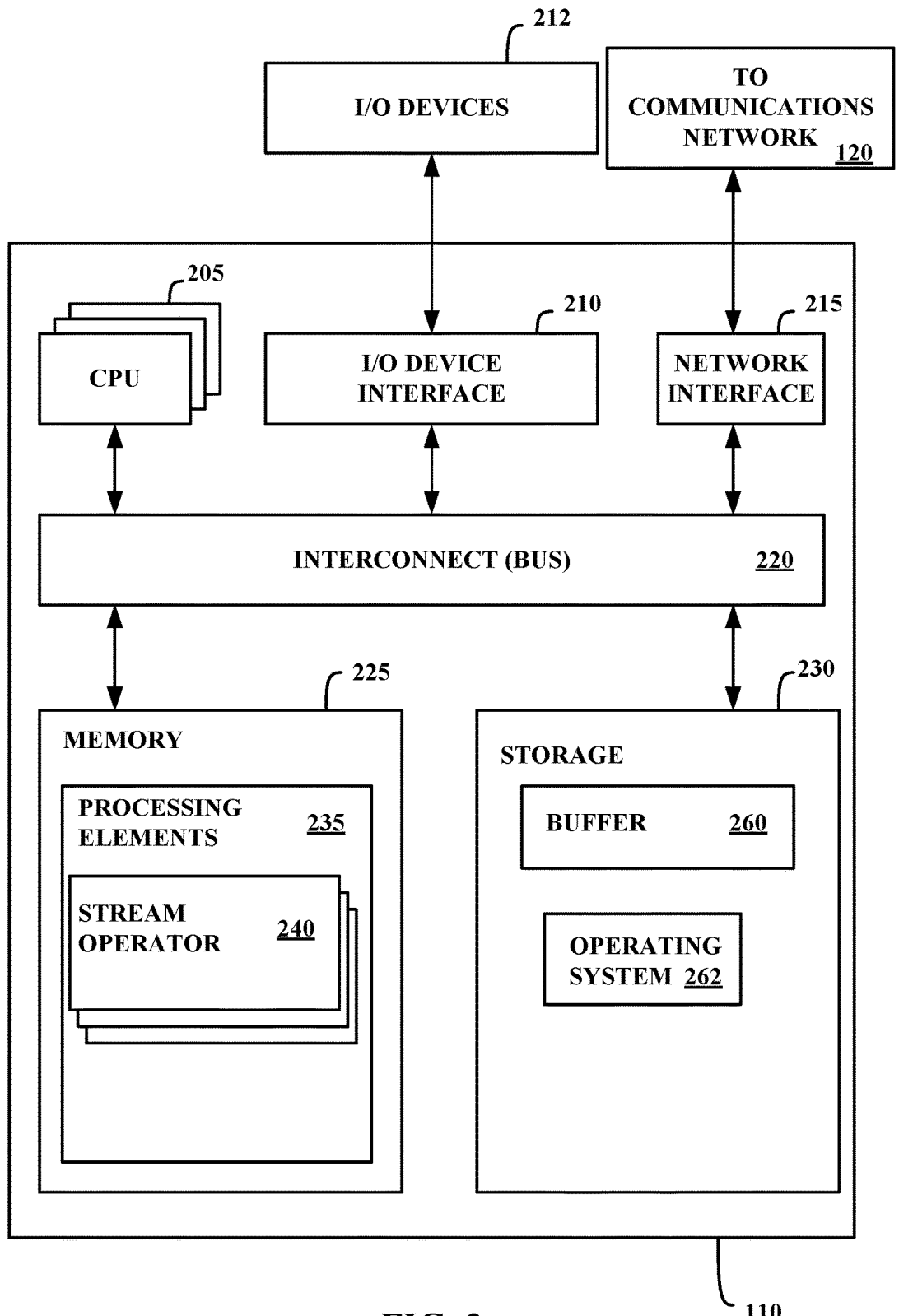
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
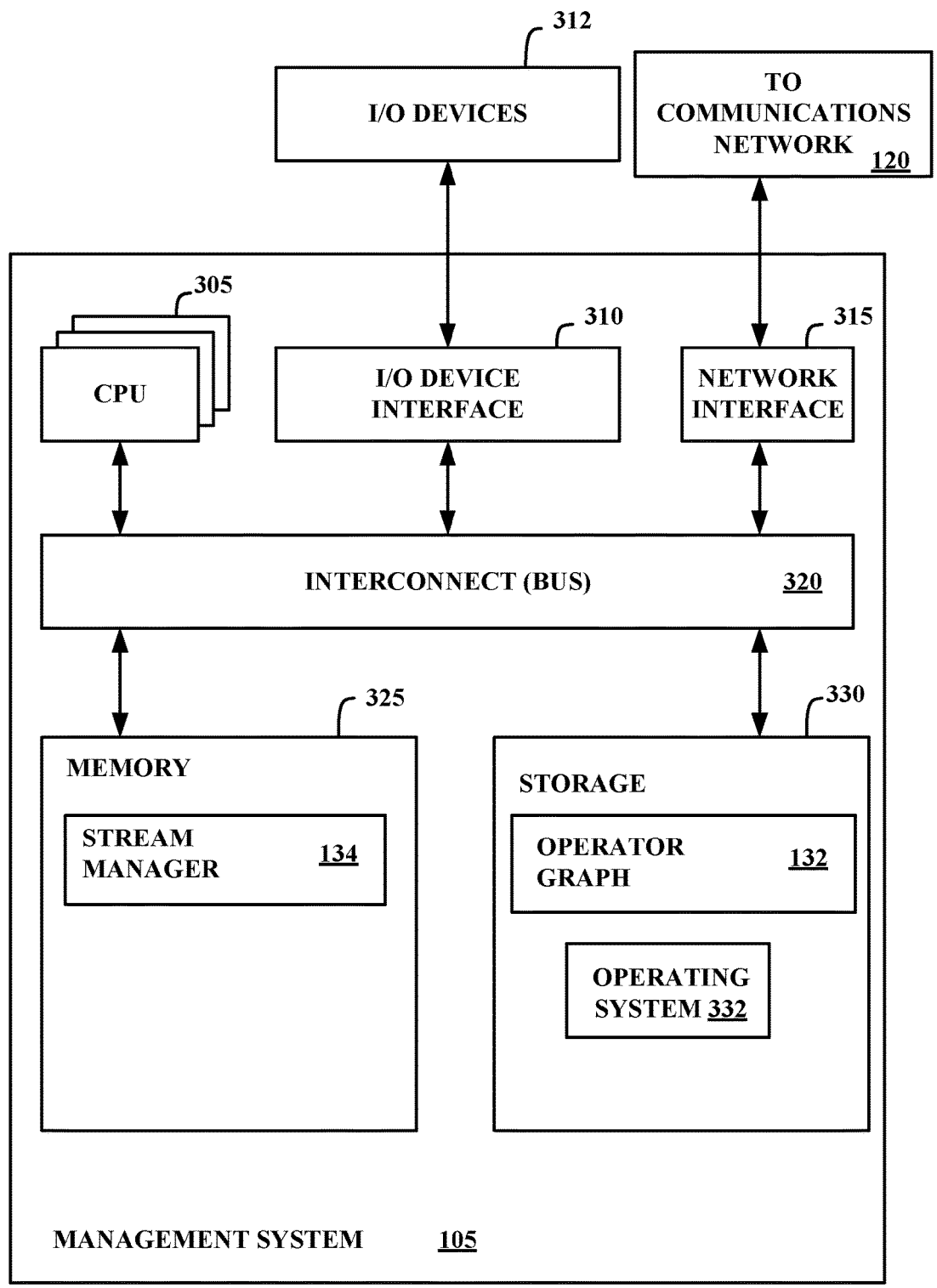
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
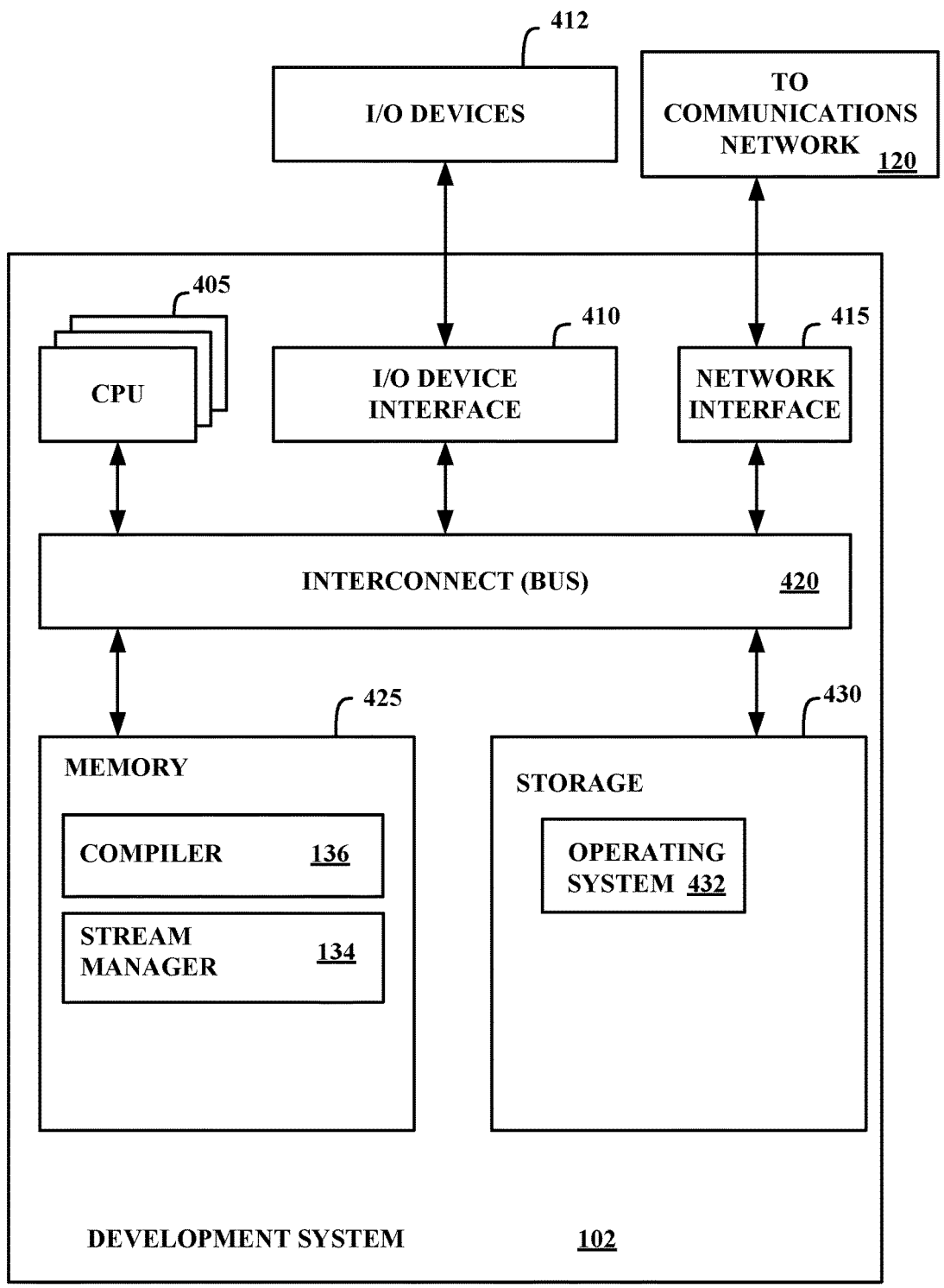
FIG. 4 illustrates a more detailed view of the development system of FIG. 1 according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

The memory 425 may also store a stream manager 134 configured to monitor the streaming environment. The stream manger 134 may monitor the operations of one or more processing elements within the streaming environment. The stream manager 134 may also output information from the processing elements to the interconnect 420 which may distribute the information to the rest of the development system 102.

Figure 5:
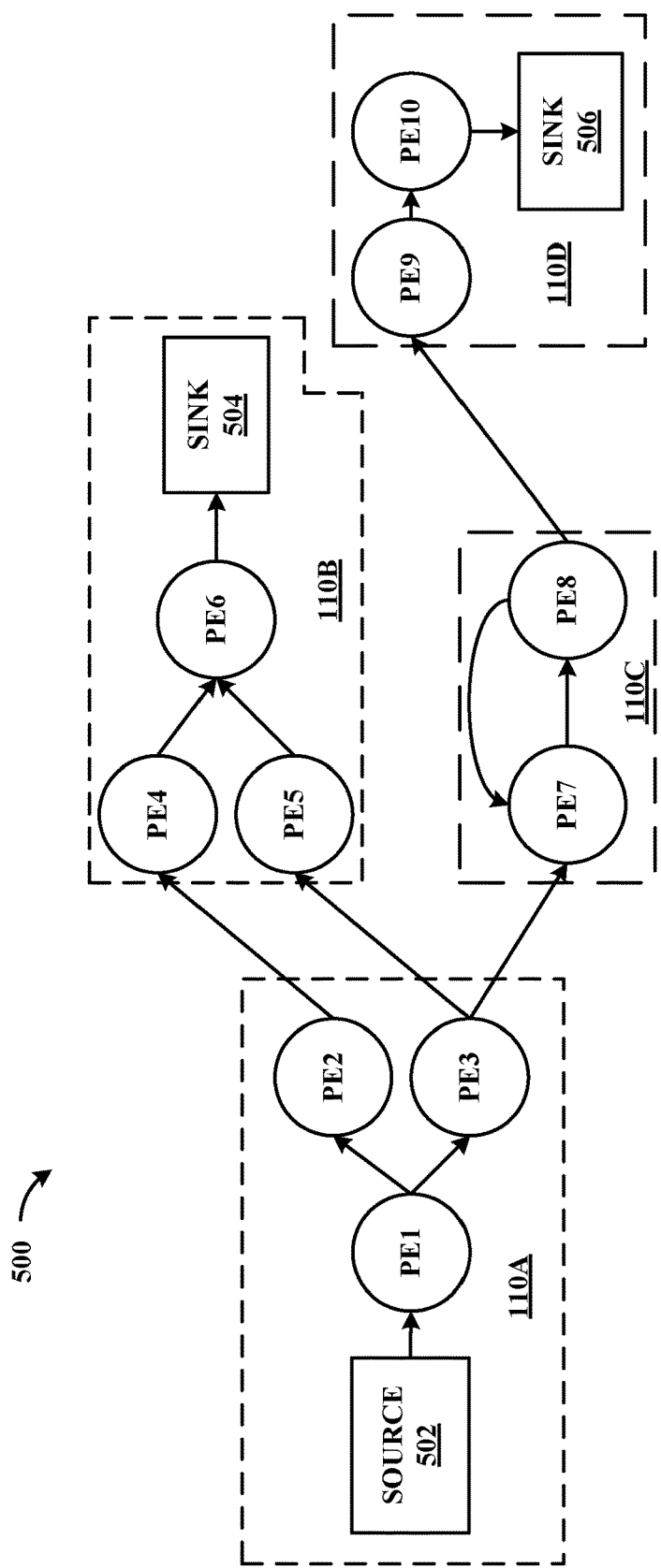
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example, PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
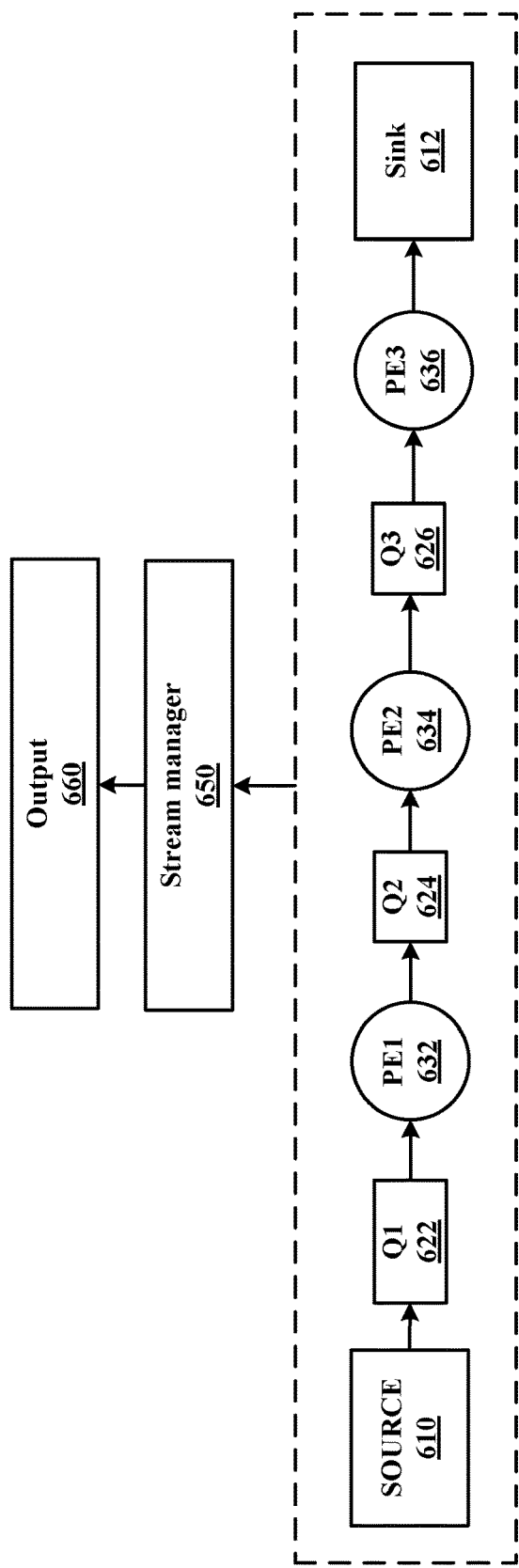
FIG. 6 illustrates of a source to sink streaming environment, according to various embodiments.

In FIG. 6, processing elements are placed within the streaming environment between a source 610 and a sink 612. Between the source and the sink, the streaming environment can be an operator graph. The operator graph may include a section or a part the streaming environment that is being monitored. The processing elements may include operators to perform tasks upon tuples moving within the operator graph. The processing elements may be monitored to determine the processing times of the tuples within a processing element. The wait times may include the queue wait time where the tuple is waiting between processing elements. The time the tuple spends within the operator graph is the execution time for the tuple to enter and leave the operator graph. The execution time may include the wait times and processing times the tuple experienced moving within the operator graph.

The processing elements may be placed between the source 610 and the sink 612. A first processing element (PE1) 632 has a first queue (Q1) 622, a second processing element (PE2) 634 has a second queue (Q2) 624, and a third processing element (PE3) 636 has a third queue (Q3) 626. The processing elements may be monitored by a stream manager 650 to determine the wait times and processing times of the tuples. The queues may include a static bucket where tuples wait to enter the next processing element. Each queue may be similar to the previous queue, and may be used to monitor tuples before they enter the processing element. The information gathered by the stream manager 650 may then be outputted to an input/output (I/O) device 660. The I/O device 660 for example, may be a GUI to display the wait state information gathered by the stream manager 650.

A first tuple may enter the streaming environment through the source 610. The first tuple may then enter Q1 622. The first tuple may wait within Q1 622 before entering PE1 632. The wait time of the first tuple within Q1 622 may be recorded by the stream manager 650. The first tuple may then enter PE1 632. The first tuple may be operated on within PE1 632 and the processing time of the PE1 may be recorded by the stream manager 650. After the first tuple is operated on by PE1 632, the first tuple may enter the Q2 624 and wait to enter PE2 634. The wait time of the first tuple within Q2 624 may be recorded by the stream manager 650. The first tuple may then enter PE2 634. The first tuple may be operated on within PE2 634 and the processing time of PE2 634 may be recorded by the stream manager 650. After the first tuple is operated on by PE2 634, the first tuple may enter Q3 626 and wait to enter PE3 636. The wait time of the first tuple within Q3 626 may be recorded by the stream manager 650. The first tuple may then enter the PE3 636. The first tuple may be operated on within PE3 636 and the processing time of PE3 636 may be recorded by the stream manager 650. After the first tuple is operated on by PE3 636, the first tuple may enter the sink 612 of the stream.

The (I/O) device 660 may receive the recorded wait times of the first tuple from the stream manager 650 and output the wait state information to an end user. The (I/O) device 660 may output the wait state information on a GUI that may be monitored by the end user. In various embodiments, the (I/O) device 660 may display the wait state information in a table. The table may include, but is not limited to, a tuple ID, a wait time of the tuple within each queue (e.g. Q1, Q2, and Q3), and a processing time of the tuple within each processing element (e.g. PE1, PE2, and PE3). The wait time and processing times may also include a total wait time within each queue, a total processing time within each processing element, and a total wait time within the operator graph. The wait time may also include time stamps of the tuple entering the stream, and a time stamp of the tuple exiting the operator graph. The time stamps may be used to calculate to total time the tuple spent within the operator graph.

In various embodiments, a tuple may leave the operator graph through a processing element before the tuple reaches the sink. An example of a tuple being removed from the operator graph may include a filter processing elements. For example, the filter processing element may remove the tuple from the operator graph according to an attribute of the tuple. The execution time of the tuple after being removed from the operator graph may be recorded by the stream manager 650. For example, when the tuple was removed from the operator graph, the wait time may be recorded as the tuple leaves the processing element. If the tuple leaves the operator graph, the total wait time, processing time and execution time may be recorded by the stream manager 650.

Figure 7A:
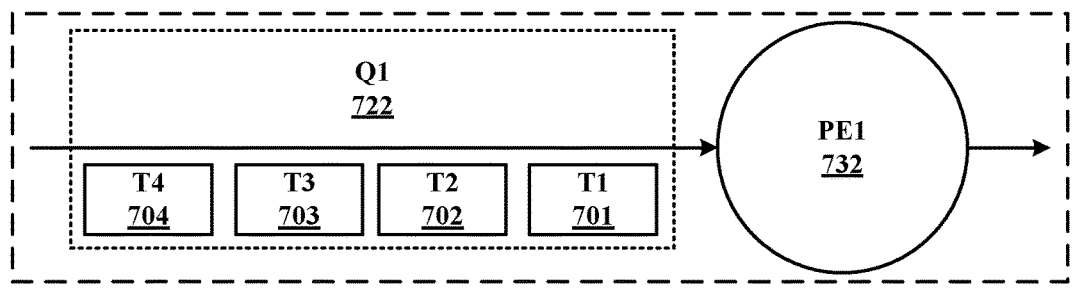
FIG. 7A illustrates a processing element with four tuples in a queue, according to various embodiments.
Figure 7B:
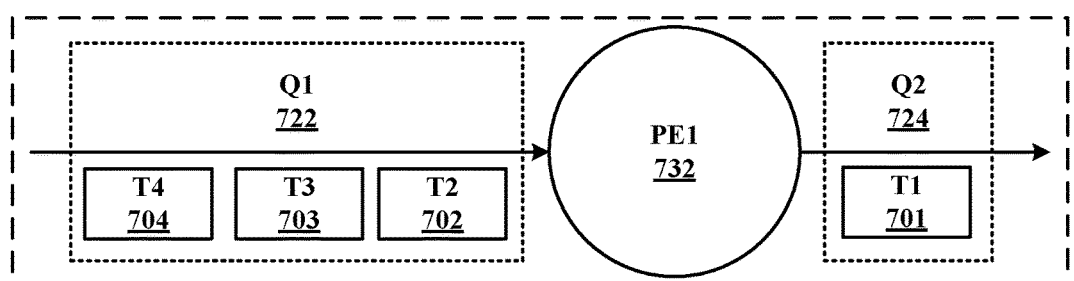
FIG. 7B illustrates a processing element with three tuples in a queue and one processed tuple, according to various embodiments.
Figure 7C:
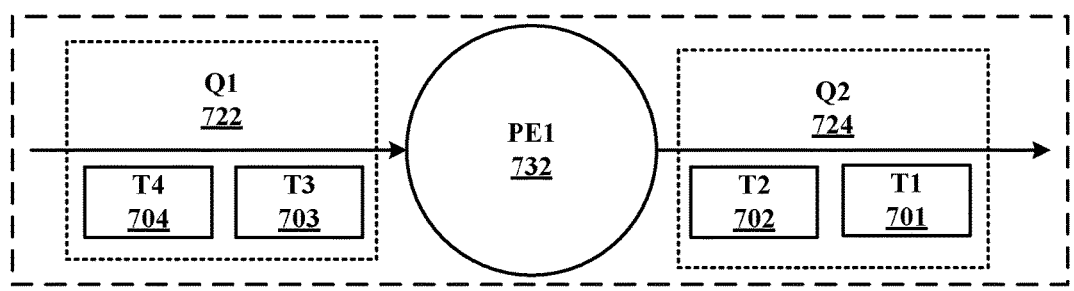
FIG. 7C illustrates a processing element with two tuples in a queue and two processed tuples, according to various embodiments.

FIGS. 7A-C illustrates a streaming environment as tuples move from a first queue into a first processing element. The tuples may then be processed by the first processing element and enter a second queue. The streaming environment may be monitored by a stream manager as tuples move from a first queue (Q1) 722 and are processed by a first processing element (PE1) 732. The tuples may then leave PE1 732 and enter a second queue (Q2) 724. Four tuples are ordered within the Q1 722, and wait to enter PE1 732. The tuples may include a first tuple (T1) 701, a second tuple (T2) 702, a third tuple (T3) 703, and a fourth tuple (T4) 704.

In FIG. 7A the first tuple 701 is next in line to leave Q1 722 and enter PE1 732. The wait time of the first tuple 701 may be recorded by the stream manager as the amount of time the first tuple waits within Q1 722. The tuple the first tuple 701 may leave Q1 722 and enter PE1 732.

In FIG. 7B, the first tuple 701 has been processed by PE1 and has moved to a second queue (Q2) 724. The second tuple 702 may be next in line to leave Q1 722 and enter PE1 732. The wait time of the second tuple 702 may be recorded by the stream manager as the amount of time second tuple 702 waits within Q1 722. For example, the wait time of second tuple 702 may include the amount of time the first tuple 701 took to leave Q1, the processing time for the first tuple to be processed by PE1 722, and enter Q2 724. The amount of wait time in the queue for the second tuple 702 to enter PE1 732 includes the processing time of the first tuple 701 within PE1 732. The second tuple 702 may then leave the Q1 722 and enter PE1 732, be processed by PE1 732 and have the processing time of the second tuple 702 recorded.

In FIG. 7C, the second tuple 702 has been processed by PE1 and has moved to a second queue (Q2) 724. The third tuple 703 may be next in line to leave Q1 722 and enter PE1 732. The wait time of the third tuple 703 may be recorded by the stream manager as the amount of time the third tuple 703 waits within Q1 722. For example, the wait time of the third tuple 703 within Q1 722 may include the amount of time that the second tuple 702 waited for the first tuple 701, and the processing time of the second tuple 702. The processing time of the second tuple 702 may include the amount of time the second tuple 702 took to leave Q1, be processed by the PE1 722, and enter Q2 724. The third tuple 703 may then leave Q1 722 and enter PE1 732 and have the processing time of the third tuple 703 recorded.

In various embodiments, the movement of the tuples may include wait times within the queue. These wait times may include the processing time of each tuple moving into and out of the processing element before the tuple being monitored enters the queue. For example, if the third tuple 703 can be monitored for the wait time within the Q1 722 may include the processing time of the first tuple 701 and the second tuple 702 within PE1 732. Once the third tuple 703 enters the PE1 732, the queue time of Q1 722 may be recorded of the third tuple 703.

In various embodiments, a tuple may be duplicated in a second copy of the tuple. Each copy of a tuple may be monitored separately by the stream manager. The stream manager may assign a new ID to the copied tuple or the stream manager could assign new tuple ID's to both of the tuples that were split.

Figure 8:
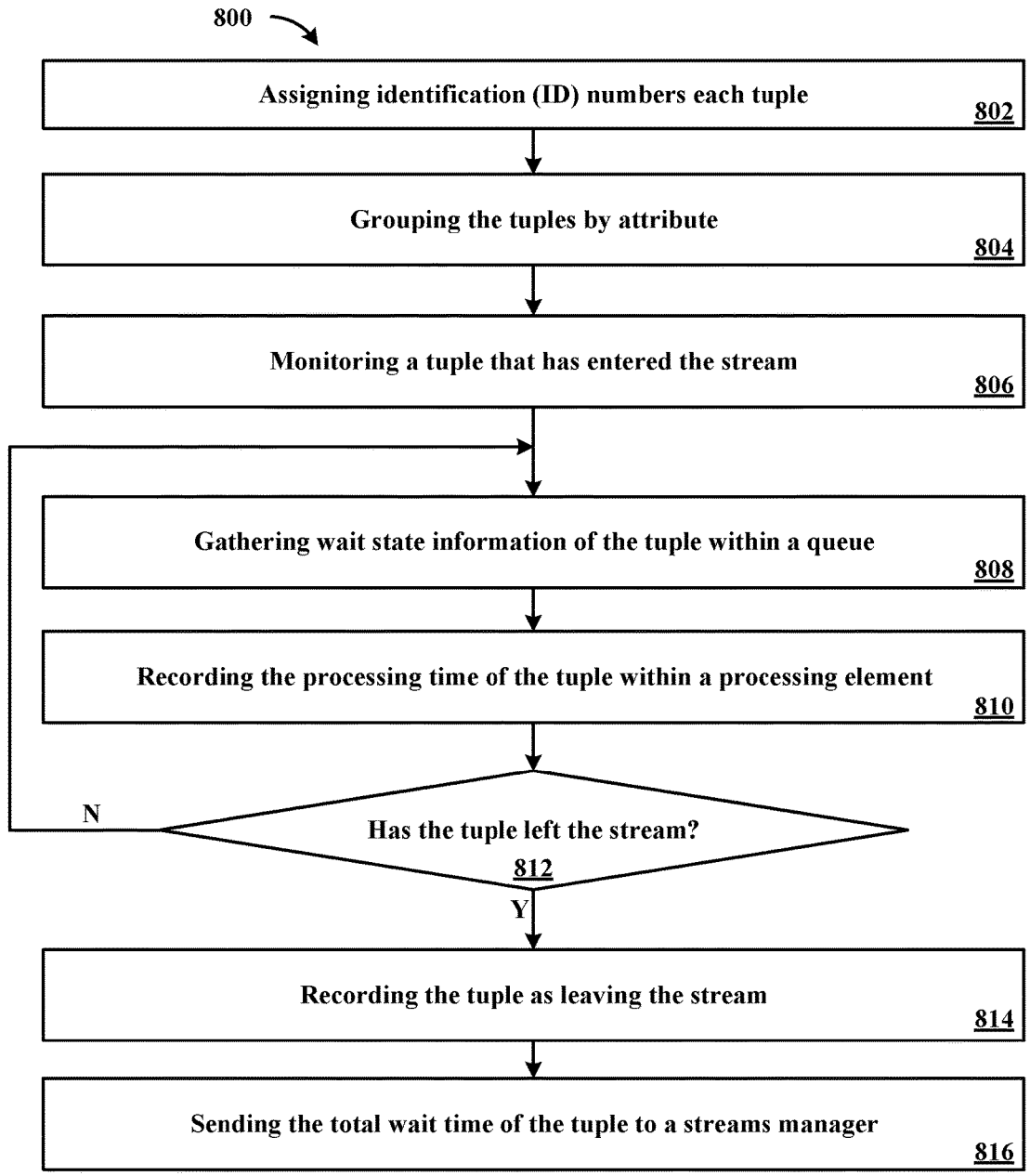
FIG. 8 illustrates a flowchart to monitor the wait times of the tuples within the streaming environment, according to various embodiments.

FIG. 8 illustrates a flowchart of a method 800 for monitoring a wait time and processing time of one or more tuples within a streaming environment. A tuple may be monitored as the tuple moves through the processing elements of the streaming environment. The wait times of the tuple may be recorded to determine the total execution time of the tuple through the stream. The wait times of the tuple may also be recorded as the amount of time the tuple spends within a queue or waiting for other tuples to be processed within the streaming environment. The tuple may be waiting for other tuples within a queue or a processing element before entering another processing element. The processing time of the tuple may also be recorded as the time the tuple spends within the processing elements of the stream.

In operation 802, each tuple entering the streaming environment is assigned a tuple ID. The ID number may be used to identify the tuple as the tuple moves throughout the stream. At a point within the streaming environment, the tuple may be identified by the ID number assigned to the tuple. For example, a hook may be used to gather a wait state information of the tuple within the streaming environment by the ID number of the tuple. The wait state information may include the location of the tuple within the streams environment, and the current wait or processing time of the tuple.

In operation 804, the tuples are grouped by their attributes. The ID numbers of the tuples may be recorded by the stream manager. The tuples may also be grouped by traits of the tuples attributes based on the streaming environment. For example, if the tuples are grouped by traits of the tuples attributes, the tuples may be monitored as a group to determine if various attributes cause tuples a longer wait time within the stream.

In various embodiments, the streaming environment may be a portion of the streaming environment being monitored by the stream manager. For example, if only a portion of the streaming environment is being monitored by the stream manager the tuples may enter the streaming environment from a processing element instead of the source. For example, if only a few processing elements of the streaming environment are being monitored by the stream manager, the tuples may enter the monitored section from a processing element. Examples of processing elements that tuples may enter from may include, but is not limited to, sources, split operators, custom operators, join operators, or barrier operators.

In various embodiments, the end of the monitored section of the streaming environment by the stream manager may not be the sink. For example, if only a portion of the streaming environment is being monitored by the stream manager the tuples may exit the streaming environment from a processing element instead of the sink. Examples of processing elements the tuple may leave the streaming environment from may include, but is not limited to, sinks, filter operators, custom operators, join operators, split operators, or barrier operators.

In operation 806, a tuple is monitored as the tuple enters the stream. The tuple may include a trait of an attribute similar to another tuple. If the tuple includes a similar trait to another tuple, the tuples may have been grouped together in operation 804. The time spent of the tuple within each processing element may be used to determine if the shared trait has an effect on the wait time of the tuple within each processing element.

In operation 808, the wait state information of a tuple may be gathered when the tuple is within a queued state within the streaming environment. The wait state information may be gathered by the stream manager. If the tuple is waiting to enter a processing element, the tuple may be recorded as waiting in a queue of the streaming environment. For example, if a second tuple is waiting to enter a processing element, which is currently operating upon a first tuple, then the second tuple may have to wait until the first tuple has been processed by the processing element. The second tuple may start a queue to wait within, which may cause every tuple following the second tuple to wait behind the second tuple before entering the processing element.

In operation 810, a tuple has entered a processing element and the processing time is being recorded. The processing time can be recorded as wait state information of the tuple may include the amount of time the tuple takes to be processed by the processing element. For example, if the second tuple has entered the processing element, the tuple may be processed by the processing element. The amount of time the processing element required to process the second tuple is recorded as processing time of the second tuple.

In operation 812, the tuple is monitored to determine if the tuple has left the streaming environment. The tuple may have left the stream or may remain within in the streaming environment by being sent to a subsequent processing element. If the tuple has left the stream, the method 800 may progress to operation 814. For example, if a first tuple enters a first processing element and the processing element removes the tuple from the streaming environment, then the tuple may be considered removed from the streaming environment, and the method 800 may progress to operation 814. A tuple may also enter a sink of the streaming environment where the tuple may be removed from the streaming environment. For example, if the tuple passes through the last processing element of the streaming environment being monitored by the stream manager and enters the sink of the stream, the tuple may be considered removed from the stream environment and the flowchart may progress to operation 814.

If the tuple remains within the streaming environment, the flowchart may return to operation 808 where the tuple may continue being operated upon within the streaming environment. The tuple may exit a processing element and enter a queue for a subsequent processing element. For example, the second tuple may exit a first processing element but remain within the streaming environment by entering a queue for a second processing element. The second processing element may be operating on a first tuple, the queue may retain the second tuple until the first tuple has exited the second processing element.

A tuple may exit a processing element and enter a subsequent processing element if the subsequent processing element is not operating on another tuple. For example, a second tuple may exit a first processing unit but remain within the streaming environment by entering a second processing element. The queue of the second processing element may not hold the second tuple if the second processing element is not operating upon a tuple.

In operation 814, the tuple can be recorded as leaving the stream. The tuple may be recorded as leaving the streaming environment by the stream manager. The stream manager may record the tuple ID of the tuple, and the time stamp of the tuple leaving the streaming environment and output the information to an input/output (I/O) device. For example, if a first tuple leaves the stream, the ID of the first tuple may be recorded and sent to a GUI that is observable by an end user. For example, the information along with the tuple ID of the first tuple may include the time stamp the first tuple to enter the stream, the wait time of the first tuple for each queue the first tuple waited in, the processing time for each processing element the first tuple passed through, and a time stamp of when the first tuple left the streaming environment. The time stamps of a tuple may include the time the tuple entered the streaming environment through the source or a first processing element being monitored by the stream manager.

In operation 816, the total execution time of a tuple may be recorded by the stream manager. The total execution time may include the time the tuple entered the streaming environment up until the time the tuple left the streaming environment. The information gathered by the stream manager may provide more detailed information to the user. The detailed information may include the amount of time the tuple spends waiting within all of the queues, and the amount of time the tuple spends being operated on within each processing element. The detailed information can result in the total amount of time the tuple spends within the streaming environment.

In various embodiments, if one or more tuples were grouped together by attributes in operation 806, the grouping of the one or more tuples may be used to determine if an attribute of the one or more tuples causes an increase in wait time. The wait information gathered by the stream manager may assist the end user in determining the efficiency or monitor conditions of the streaming environment.

Figure 9:
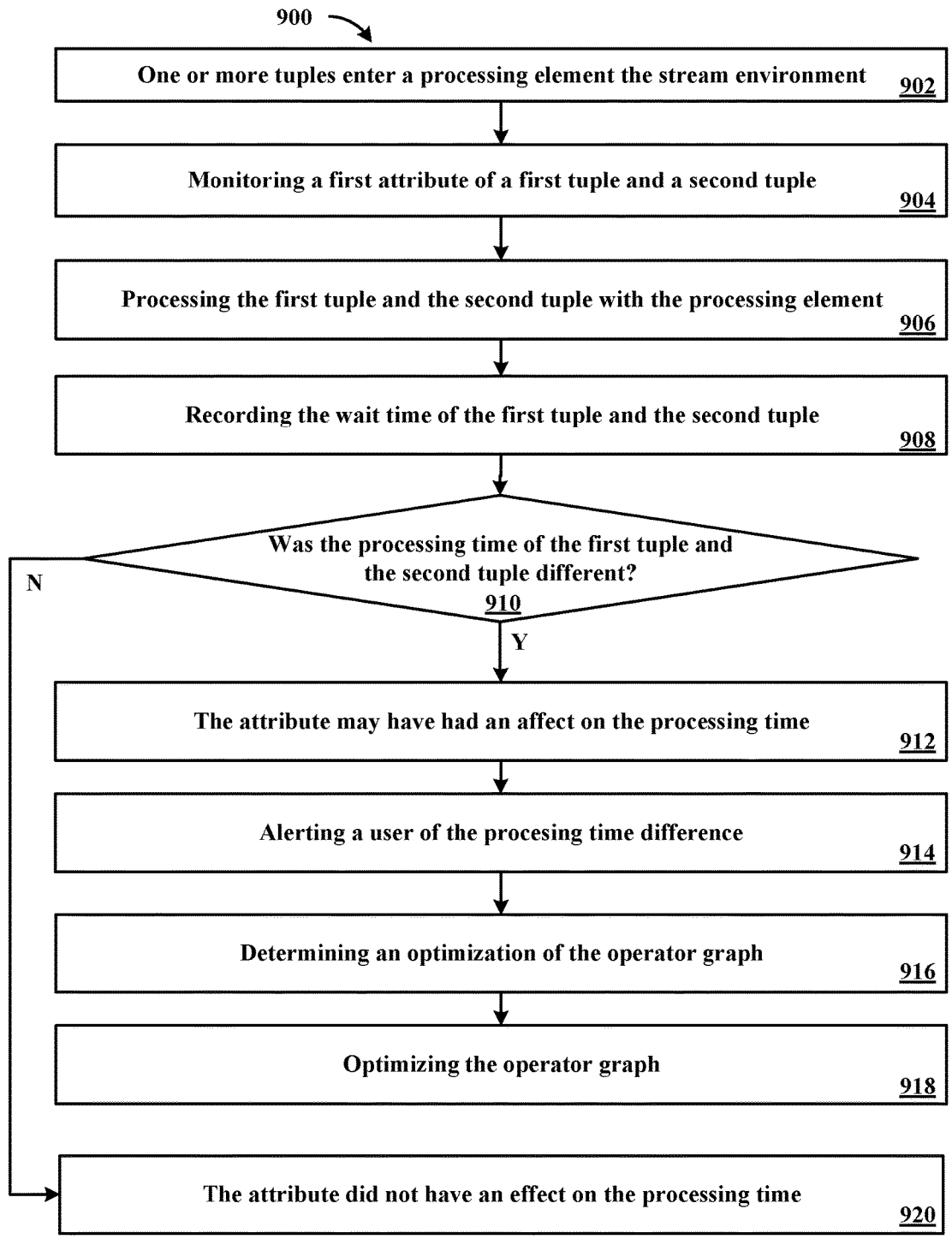
FIG. 9 illustrates a flowchart to determine a difference in wait times of the tuples within the streaming environment, according to various embodiments.

In FIG. 9, a flowchart is illustrated of a method 900 for determining if a processing time of a first tuple is longer than a processing time of a second tuple within a processing element (e.g., a first same processing element). In operation 902, one or more tuples may enter a processing element of the streaming environment. For example, one or more tuples may enter a first processing element of the streaming environment. The one or more tuples may include a first tuple and a second tuple. The first tuple and the second tuple may include one or more attributes that each includes a trait of the one or more attributes.

In operation 904, a stream manager can monitor attributes of a first tuple and a second tuple. For example, the first tuple may contain a first attribute with a first trait, and the second tuple may contain the first attribute with a second trait. The first trait and the second trait may be different and may be monitored for separately. For example, the attribute may be a yes or no question of a person's medical records as a tuple within the database. The traits could include a first yes answer of a first person, and a second no answer of a second person.

In operation 906, the first tuple and the second tuple may be processed by a processing element (e.g., a first processing element). The first tuple and the second tuple may enter the processing element, be operated on by the processing element, and exit the processing element. For example, the first tuple may enter the processing element, be operated on, and then leave the processing element. The second tuple may then enter the processing element, be operated upon, and then leave the processing element.

In various embodiments, more than one processing element may be monitored at a time. Each of the one or more processing elements may be monitored to determine the processing time of the first tuple and the second tuple.

In various embodiments, more than the first tuple and the second tuple of the one or more tuples may be monitored. Each of the one or more tuples may be monitored as they move within the streaming environment.

In various embodiments, one or more tuples may be grouped by traits of the first attribute. If one or more tuples share the first trait of the first attribute, they may be grouped together to determine correlations between processing time and attributes of the tuples.

In operation 908, the processing times of the first tuple and the second tuple may be recorded. For example, the processing times may be recorded by a stream manager. The stream manager may record the amount of time the first tuple and the second tuple spend within the first processing element.

In decision block 910, it is determined whether the processing time of the first tuples is different from the processing time of the second tuple. The processing times may be compared and if the processing times are different, the flowchart may progress to operation 912. For example, the first tuple may have a processing time within the first processing element of 2 seconds, and the second tuple may have a processing time in the first processing element of 1 second. If the processing time of the first tuple and the second tuple are different, then the trait may have affected the processing time of the first tuple. Since the processing time of the first tuple and the second tuple are different, the flowchart may progress to operation 912. If the processing time of the first tuple and the second tuple is the same, the flowchart may progress to operation 920. For example, the first tuple has a processing time within the first processing element of 1 second, and the second tuple has a processing time in the first processing element of 1 second. Since the processing time of the first tuple and the second tuple are the same, the flowchart may progress to operation 920.

In operation 912, the first attribute may have affected the processing time of the first tuple or the second tuple. The attribute being monitored could contain a trait that causes a longer or shorter processing time of the tuple within the first processing element. For example, the first tuple may contain a trait with more information for the first processing element to process. The more information of the trait may cause the processing time of the first tuple to be longer than the processing time of the second tuple, resulting in a difference in the processing time.

In various embodiments, the attribute of the first and second tuples being monitored may not have affected the processing time. A second attribute may have caused the difference in processing time. For example, if a second attribute included a first trait of the first tuple and a second trait of a second tuple mat result in the difference in the processing times of the first tuple and the second tuple.

In various embodiments, the processing times of the first tuple may be grouped with a first group of tuples, and the processing times of the second tuple may be grouped with a second group of tuples. The grouping of tuples can allow the stream monitor to pull processing times from multiple tuples with the same trait of the attribute. By grouping multiple tuples, an average may be taken of the group of tuples. The average can include one or more tuples that include the same trait of an attribute. For example, one or more tuples may include a trait of yes as an attribute of a question. All of the tuples including the yes trait may be grouped together, and all of the tuples with the no trait may be grouped together.

In operation 914, a user may be alerted of the difference between the processing time of the first tuple and the second tuple. An alert may be sent to a user based on the determination that the processing time of the first tuple and the second tuple are different. For example, the alert may be issued to the user informing the user that the processing time of the first tuple and the second tuple are different. The alert may include a text based alert displayed upon a GUI.

In operation 916, the operator graph may determine an optimization of the operator graph based on the processing time difference of the first tuple and the second tuple. The operator graph may be altered based on the attribute that causes the processing time difference between the first tuple and the second tuple. For example, a processing element may be added to the operator graph. A split processing element may be placed before the processing element to send tuples to a second processing element if the processing time within the processing element will cause too long of a processing time. The split processing element will gather the tuples with the trait of the first attribute with the longer wait time and send the tuples to a second processing element.

In operation 918, the operator graph may be optimized. If an optimization of the operator graph is determined, the operator graph may be optimized to increase the efficiency of the operator graph. If an optimized operator graph is determined, then the operator graph can be changed to the new operator graph. The optimization may include optimization instructions that are sent to a streams manager. The streams manager may then optimize the operator graph.

In operation 920, the attribute may not have affected the processing time of the first tuple and the second tuple within the processing element. The processing time of the first tuple and the second tuple are the same, indicating that the attribute may not have affected the processing times.

In various embodiments, the optimized operator graph may be listed along other suggestions for a streams administrator to choose. The list may be displayed on an interface. The interface may include one or more optimized operator graphs the streams administrator may choose. The list may include optimization instructions for each optimization on the list. Upon the selection by the streams administrator a streams manager may optimize the operator graph.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for managing a streaming environment, comprising:
   a memory;
   a processor device communicatively coupled to the memory;
   wherein the processor device is configured to:
     monitor one or more tuples within an operator graph, wherein the operator graph further comprises:
       a first processing element which operates on one or more computer processors configured to process a data stream, the first processing element including at least two stream operators fused together, and
       a first queue of the first processing element;
     record a wait time of the one or more tuples within the first queue of the first processing element;
     record a processing time of the one or more tuples within a processing stage of the first processing element;
     display, in response to recording, the wait time of the one or more tuples within the first queue of the first processing element and the processing time of the one or more tuples within the processing stage upon a user interface;
     optimize, in response to recording the processing time of the one or more tuples, a configuration of the operator graph;
     monitor attributes of the one or more tuples, wherein the attributes further comprise:
       a set of attributes defining a tuple,
       a trait for each of the set of attributes of the tuple;
     monitor a first tuple with a first trait of a first attribute;
     monitor a second tuple with a second trait of a first attribute;

record a first processing time of the first tuple within the first processing element;
record a second processing time of the second tuple within the first processing element;
compare the first processing time of the first tuple with the second processing time of the second tuple;
determine whether the first processing time of the first tuple in the first processing element is longer than the second processing time of the second tuple in the first processing element;
alert, in response to determining that the first processing time is longer, a user that the first processing time is longer; and
optimize, based on the first processing time being longer, the operator graph configuration, the optimizing configured to decrease the first processing time.

2. The system of claim 1, wherein alerting the user further comprises:
informing the user that the first trait of the first attribute caused additional waiting time within the first processing element; and
outputting the processing time of the one or more tuples within the first processing element.

3. The system of claim 1, wherein the stream manager is further configured to:
display the wait time of the one or more tuples;
display a tuple identification number of the one or more tuples;
display a wait time of the one or more tuples within one or more processing element; and
gather wait time statistics of each of the one or more tuples based on the wait time of each of the one or more tuples.

4. The system of claim 3, wherein the wait time of the one or more tuples with the first trait of the first attribute are grouped together separate from the one or more tuples with the second trait of the first attribute.

5. The system of claim 1, wherein the display of the streams manager includes:
displaying an optimized operator graph;
receiving optimization instructions; and
optimizing the configuration of the operator graph.

6. A computer program product for managing a streaming environment comprising a computer readable storage medium having a computer readable program stored therein, wherein the computer readable program, when executed on a computing device, causes the computing device to:
monitor one or more tuples within an operator graph, wherein the operator graph further comprises:
a first processing element which operates on one or more computer processors configured to process a data stream, the first processing element including at least two stream operators fused together, and
a first queue of the first processing element;
record a wait time of the one or more tuples within the first queue of the first processing element;
record a processing time of the one or more tuples within a processing stage of the first processing element;
display, in response to recording, the wait time of the one or more tuples within the first queue of the first processing element and the processing time of the one or more tuples within the processing stage upon a general user interface;
receive, in response to displaying upon the general user interface, optimization instructions;
optimize, in response to recording the processing time of the one or more tuples, a configuration of the operator graph;
monitor attributes of the one or more tuples, wherein the attributes further comprise:
a set of attributes defining a tuple, and
a trait for each of the set of attributes of the tuple;
monitor a first tuple with a first trait of a first attribute;
monitor a second tuple with a second trait of a first attribute;
record a first processing time of the first tuple within the first processing element;
record a second processing time of the second tuple within the first processing element;
compare the first processing time of the first tuple with the second processing time of the second tuple;
inform the user that the first trait of the first attribute caused additional waiting time within the first processing element;
output the processing time of the one or more tuples within the first processing element; and
optimize, based on the first attribute causing additional waiting time within the first processing element, the operator graph configuration, the optimizing configured to decrease the first processing time.

7. The computer program product of claim 6, wherein the computer readable program further causes the computing device to:
determine whether a first processing time of the first tuple in the first processing element is longer than a second processing time of the second tuple in the first processing element; and
alert, in response to determining that the first processing time is longer, a user that the first processing time is longer.

8. The computer program product of claim 7, wherein the computer readable program further causes the computing device to:
display the wait time of the one or more tuples;
display a tuple identification number of the one or more tuples;
display a wait time of the one or more tuples within one or more processing element; and
gather wait time statistics of each of the one or more tuples based on the wait time of each of the one or more tuples.

* * * * *